United States Patent [19]

Rockwood

[11] Patent Number: 5,484,267

[45] Date of Patent: Jan. 16, 1996

[54] COOLING DEVICE FOR A PUMP AND CORRESPONDING BARRIER TANK

[75] Inventor: Robert E. Rockwood, Windham, N.H.

[73] Assignee: Environamics Corp., Hudson, N.H.

[21] Appl. No.: 214,288

[22] Filed: Mar. 17, 1994

Related U.S. Application Data

[63] Continuation-in-part of Ser. No. 200,012, Feb. 22, 1994.

[51] Int. Cl.6 ................................................. F04B 39/06
[52] U.S. Cl. ........................... 417/53; 417/372; 137/563; 277/22
[58] Field of Search ........................ 417/423.8, 228, 417/372, 53; 415/175; 137/563; 277/65, 59, 27, 3, 22, 81 R; 310/62, 63, 64, 89, 112; 165/47

[56] References Cited

U.S. PATENT DOCUMENTS

| | | | |
|---|---|---|---|
| 2,005,429 | 6/1935 | Lichtenstein | 415/168.2 |
| 2,373,609 | 4/1945 | Stahl | 310/104 |
| 2,386,505 | 10/1945 | Puchy | 417/420 |
| 2,628,852 | 2/1953 | Voytech | 277/15 |
| 2,820,653 | 1/1958 | Yokel | 277/61 |
| 2,824,759 | 2/1958 | Tracy | 277/15 |
| 3,195,035 | 7/1965 | Sudmeier | 417/372 |
| 3,489,719 | 1/1970 | Stratienko | 277/22 |
| 3,515,497 | 6/1970 | Studebaker et al. | 415/112 |
| 4,109,920 | 8/1978 | Wiese | 277/17 |
| 4,114,899 | 9/1978 | Külzer et al. | 277/22 |
| 4,172,697 | 10/1979 | Schoen | 415/175 |
| 4,439,096 | 3/1984 | Rockwood et al. | 415/131 |
| 4,721,311 | 1/1988 | Kakabaker | 277/22 |
| 4,900,039 | 2/1990 | Klecker et al. | 277/27 |
| 5,249,812 | 10/1993 | Volden et al. | 277/15 |
| 5,261,676 | 11/1993 | Rockwood | 277/42 |
| 5,308,229 | 5/1994 | DuPuis et al. | 417/372 |
| 5,340,273 | 8/1994 | Rockwood | 277/65 |

*Primary Examiner*—Richard A. Bertsch
*Assistant Examiner*—Peter G. Korytnyk

[57] ABSTRACT

A centrifugal pump system including a pump having a rotating seal disposed therein, the temperature of the seal being substantially maintained at an acceptable level by circulating a temperature stabilizing liquid to and from a chamber arranged immediately adjacent the rotating seal. A cooling or barrier tank is positioned adjacent the pump, the cooling tank for receiving the temperature stabilizing liquid from the chamber, allowing it to cool, and directing it back into the chamber thereby maintaining the temperature of the liquid adjacent the rotating seal at a substantially constant and acceptable level. A blower or fan is positioned adjacent both the pump and the cooling tank so as to simultaneously blow air across both of them in order to maintain the temperatures of the pump motor, the liquid within the cooling tank, and the rotating seal at acceptable levels.

15 Claims, 8 Drawing Sheets

Fig. 1

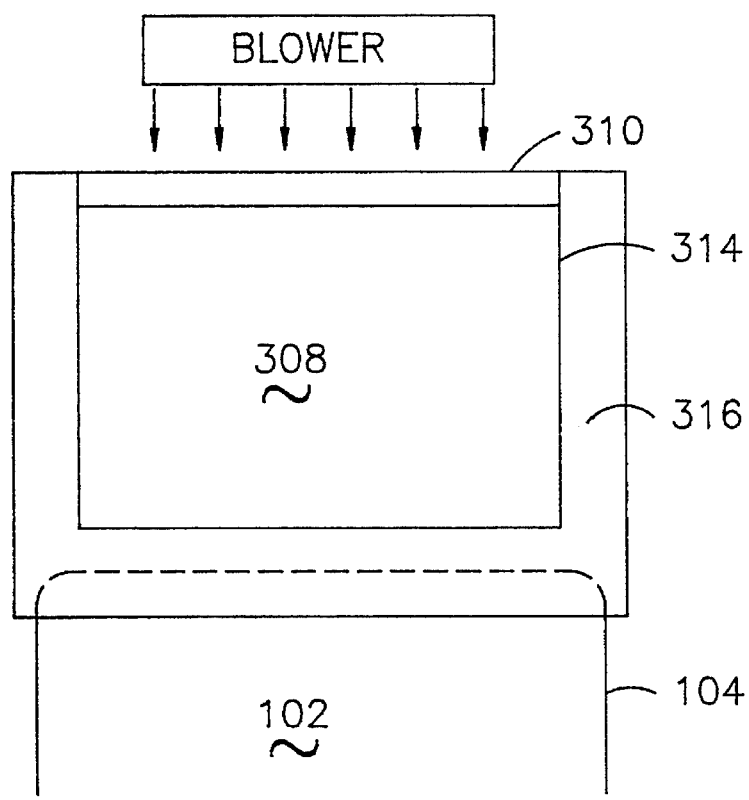
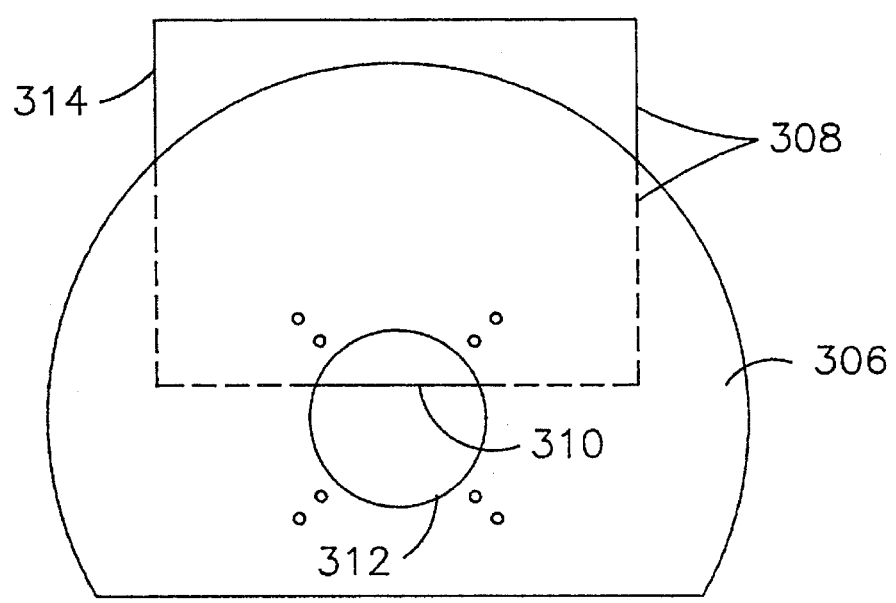

COOLING DEVICE FOR A PUMP AND CORRESPONDING BARRIER TANK

This is a continuation-in-part application of commonly owned U.S. Ser. No. 08/200,012 filed Feb. 22, 1994, currently still pending, the disclosure of which is hereby incorporated herein by reference.

This invention relates to a pump system including a temperature stabilizing device. More particularly, this invention relates to a pump system having a temperature stabilizing fluid circulating system and a blower for simultaneously cooling both the pump motor and a corresponding temperature stabilizing barrier tank.

BACKGROUND OF THE INVENTION

Environmentally hazardous fluids such as acids, oils, and toxins which can cause serious harm to the environment often need to be pumped through fluid flow systems from one location to another. When pumping such dangerous flow materials, it is important that neither the liquid nor the gases which are often released by the liquid escape to the atmosphere or pump areas outside the desired fluid pumping path.

Heretofore, conventional mechanical seals have been developed in order to overcome rotating pump shaft sealing problems. These prior art mechanical seals allow for a fairly secure seal against the pumped fluids so as to prevent them from leaking or escaping axially along the shaft of the pump. Yet, in some cases the hazardous fluid being pumped penetrates these seals when the pressure within the pump becomes too high for the seal to handle, thus allowing the fluid to escape into the surrounding environment and/or the motor area of the pump.

Another problem with the aforesaid conventional mechanical seals is that gases (i.e. vapors) produced by the liquids being pumped and sealed against often escape. Conventional mechanical seals are often permeated by these vapors. One solution to this problem was the creation of an arrangement known in the art as a double seal with barrier fluid protection. In this type of arrangement, two seals form a cavity which is filled with a clean or environmentally safe barrier fluid. The seal facing the excess hazardous liquid (i.e. the first seal), that which does not exit the pump where desired, inhibits movement of the liquid sufficiently to prevent penetration of the seal by the liquid. The vapor produced by the liquid which permeates the first seal is stopped by the barrier fluid disposed in the cavity.

A drawback associated with these conventional double seal systems is that any failure by the first seal can defeat the entire double seal arrangement. If the first of the two seals breaks down, the barrier fluid is permitted to escape from the cavity in effect allowing the harmful gases to penetrate the second seal thus reaching the surrounding environment. Furthermore, the harmful liquid, after the break-down of the first seal, often penetrates the second seal thus creating both gaseous and liquid leakage. These leakages typically ruin the motor which drives the pump and pollute the surrounding environment.

The breaking of the aforesaid double seals is a problem of longstanding concern due to the fact that the barrier fluid in the cavity must be maintained at a relatively high barrier pressure in order to be effective. These high pressures within the cavity often result in a break or leak in one of the two seals.

U.S. Pat. No. 5,261,676, the disclosure of which is hereby incorporated herein by reference, discloses an environmentally safe pump including a rotating triplex seal construction disposed axially along the pump shaft. This patent is prior art to the instant application due to an offer for sale more than one year before the filing date of this application.

While the aforesaid triplex seal construction provides excellent results, it is felt that its three rotating annular sealing interfaces could be improved regarding their sensitivity to both temperature and pressure. The sealing interfaces between the rotating flange seals and stationary engaging members are preferably held to flatness tolerances of about two helium light bands (0.000023 inches) or less. Therefore, as in virtually all mechanical seals, small changes in temperature or pressure can minimize the effectiveness of the flatness of the sealing interface between the rotating sealing surfaces and their corresponding triplex stationary sealing members. For example, changes in temperature may cause the sealing surfaces to expand or contract thereby eventually creating a small gap through which the fluid to be sealed against can leak.

It is known to circulate cooling fluid to and from a pump chamber for the purpose of cooling or substantially maintaining the temperature of seals within the pump. However, such systems generally require an additional pump to circulate the cooling fluid, and the remotely positioned barrier or coolant tank is typically cooled by way of a blower separate and distinct from the blower/fan used to cool the pump motor. Thus, a pair of pumps and a pair of blowers are generally required in these types of systems, thereby increasing their cost and maintenance requirements.

It is apparent from the above that there exists a need in the art for a pump system including a seal construction which is even less sensitive to surrounding changes in temperature and pressure. Such a system must be simple, economical, and environmentally safe.

It is a purpose of this invention to fulfill the above-described needs, as well as other needs apparent to the skilled artisan from the following detailed description of this invention.

SUMMARY OF THE INVENTION

Generally speaking, this invention fulfills the above-described needs in the art by providing a pump system comprising:

a motor for rotating a pump shaft within a pump;

a fluid pumping impeller coupled to the pump shaft, the impeller for pumping a fluid from a fluid inlet to a fluid outlet defined in the pump;

a rotating fluid seal disposed within the pump;

a temperature stabilizing chamber adjacent the rotating seal, the chamber housing a temperature stabilizing fluid for maintaining the seal at a substantially constant and acceptable temperature;

a conduit system for circulating the temperature stabilizing fluid from the chamber to a fluid cooling tank remote from the seal, and thereafter back to the chamber from the tank;

a blower affixed adjacent the pump by way of a cowl, the cowl being disposed between the blower and the motor;

the blower for simultaneously blowing air across both the motor and the tank so as to cool each of the motor and the temperature stabilizing fluid in the tank, the result being that the seal is maintained at a substantially constant and acceptable temperature as the temperature stabilizing fluid is circulated back into the chamber adjacent the seal after being cooled by the blower while in the cooling tank.

In certain further preferred embodiments of this invention, the cowl includes a baffle for splitting the air blown by the blower into first and second portions, the first portion flowing across the motor and the second portion flowing across the cooling tank.

In certain other preferred embodiments of this invention, the cooling tank has a liquid level sensor disposed therein for determining the level of temperature stabilizing fluid in the tank, and the system further comprises an alarm coupled to the liquid level sensor for halting operation of the pump if the fluid level in the tank drops below a predetermined point, the temperature stabilizing fluid being a liquid.

This invention further fulfills the above-described needs in the art by providing a method of stabilizing the temperature of a rotating seal disposed within a pump at an acceptable level, the method comprising the steps of:

a) providing in the pump a shaft for rotating a fluid pumping impeller;

b) driving the shaft by way of a motor affixed to the pump;

c) providing a rotating seal within the pump for preventing the fluid being pumped by the impeller from leaking axially along the shaft toward the motor;

d) providing a temperature stabilizing chamber adjacent the rotating seal for maintaining the temperature of the rotating seal at an acceptable level;

e) circulating a temperature stabilizing liquid from the chamber to a barrier tank;

f) heating or cooling the temperature stabilizing liquid while the liquid is in the barrier tank;

g) circulating the stabilized (i.e. heated or cooled) liquid back into the temperature stabilizing chamber adjacent the seal from the barrier tank so as to maintain the temperature of the liquid in the chamber and thus the adjacent seal at a substantially constant and acceptable level; and h) cooling the motor and heating or cooling the temperature stabilizing liquid within the tank by using a blower to simultaneously blow air across both the barrier tank and the motor.

This invention will now be described with reference to certain embodiments thereof as illustrated in the following drawings.

IN THE DRAWINGS

FIG. 1 is a longitudinal partial cross-sectional view of a pump system according to an embodiment of this invention.

FIG. 7 is a top elevational view of the cowl disposed between the blower and pump motor of the aforesaid pump system embodiment of this invention.

FIG. 8 is a rear elevational view of the cowl of the aforesaid embodiment of this invention.

DETAILED DESCRIPTION OF CERTAIN EMBODIMENTS OF THIS INVENTION

Figure 2:
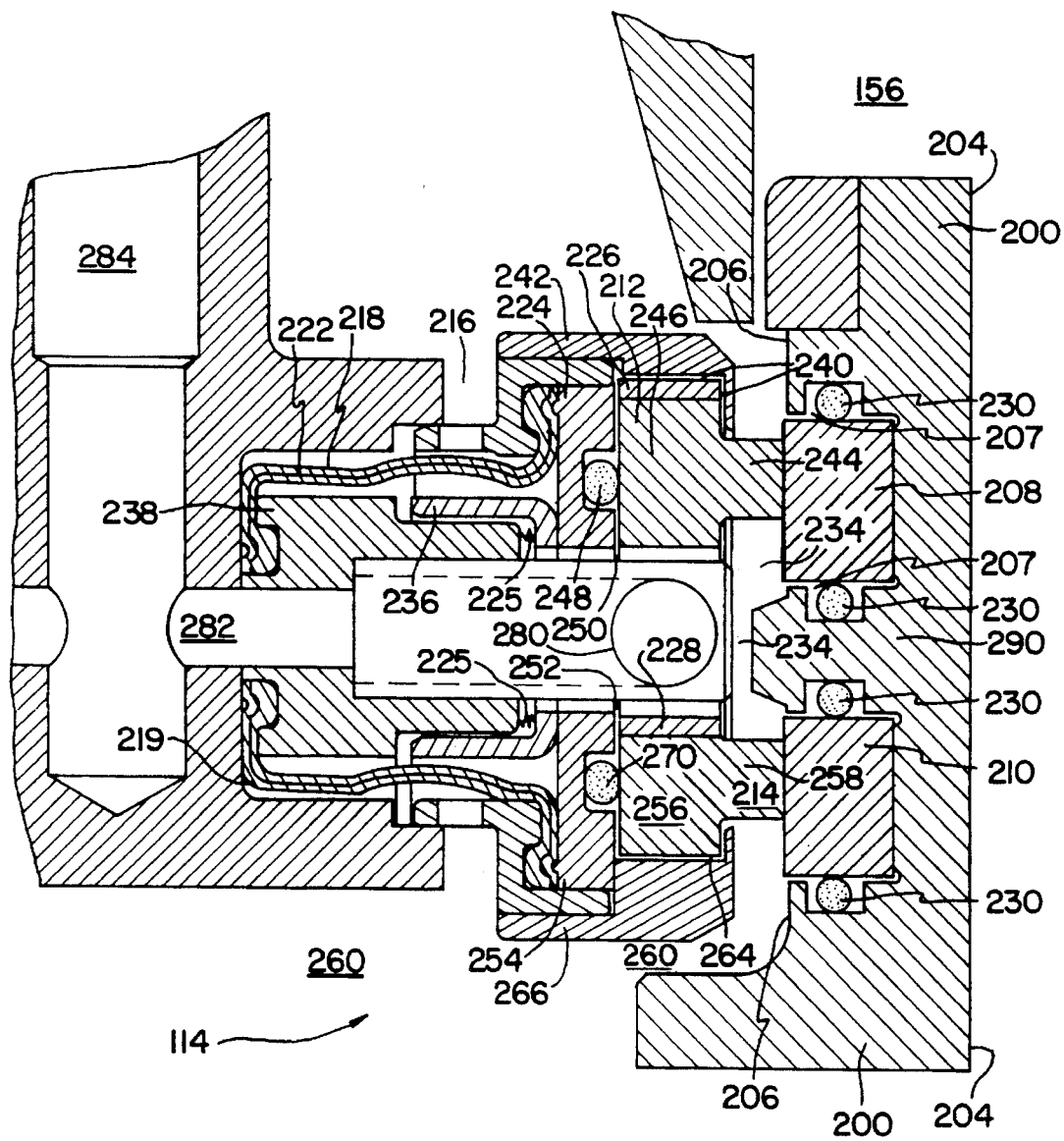
FIG. 2 is an enlarged longitudinal cross-sectional view of a portion of the rotating quad-seal and adjacent temperature stabilizing chamber of the FIG. 1 pump system embodiment of this invention.

Referring now more particularly to the accompanying drawings in which like numerals indicate like parts throughout the several views.

Figure 1:
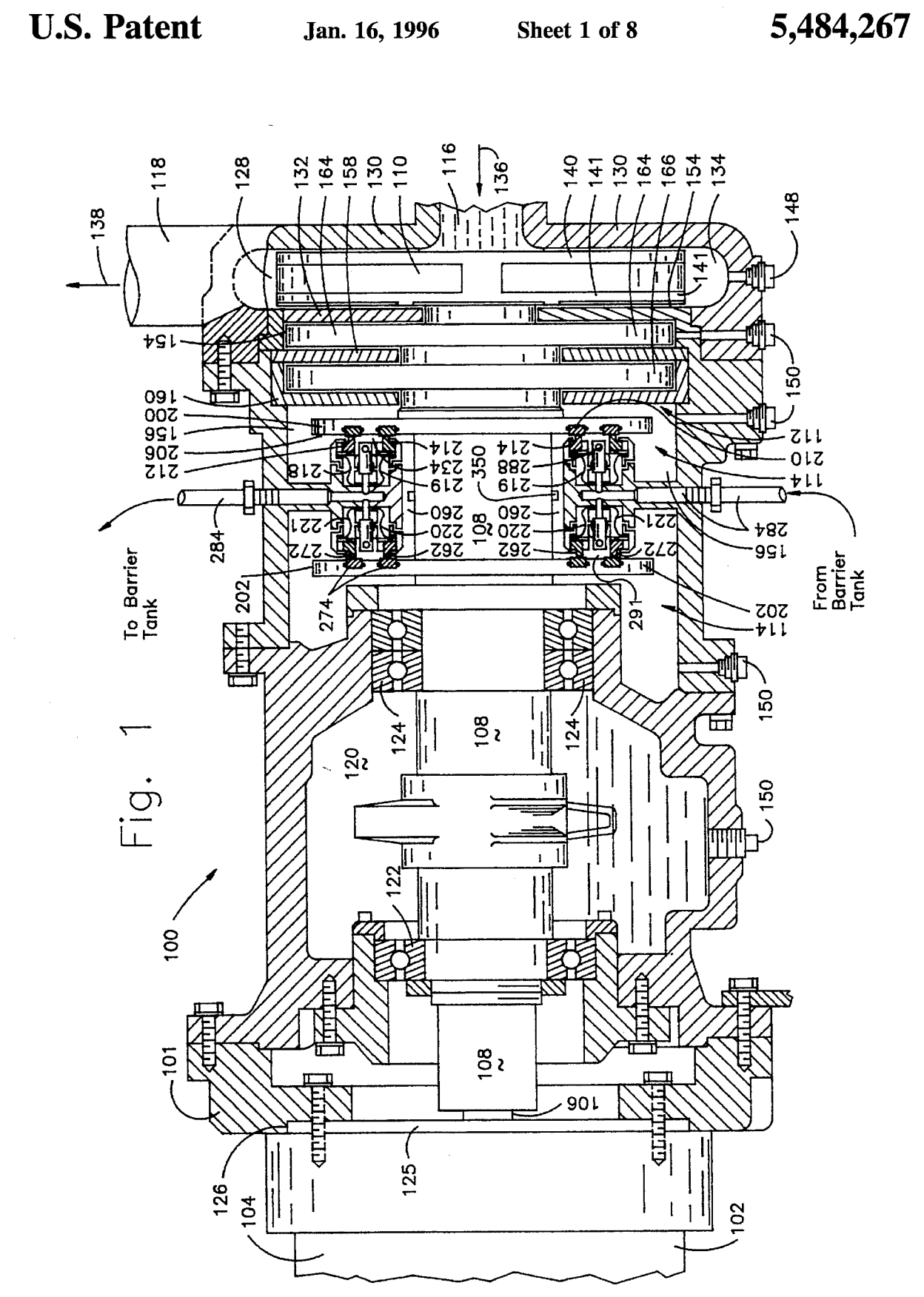

FIG. 1 is a longitudinal cross-sectional view of a hermetically sealed centrifugal pump system including a rotating quad-seal construction according to an embodiment of this invention. Pump 100 is preferably used for pumping hazardous fluids (i.e. gases or liquids) such as acids, oils, and the like, but of course may also be used for pumping non-hazardous fluids.

Pump 100 includes conventional electric motor 102 (preferably hermetically sealed) enclosed within metallic casing 104. Casing 104 includes cooling fins 105 defined in its exterior periphery as more clearly shown in FIG. 5. Motor 102 includes drive shaft 106 which is coupled at one longitudinal end to pump shaft 108, pump shaft 108 being affixed at one longitudinal end to impeller 110 and at the other longitudinal end to motor drive shaft 106. An inert gas (e.g. Nitrogen) may be introduced into motor housing 104 via a port (not shown) so as to hermetically seal the motor within housing 104 thus preventing foreign materials from leaking thereinto.

As shown, pump 100 includes at least two different barrier sealing devices including repeller assembly 112 and quad-seal construction 114. A piston seal type barrier seal (not shown) may also be provided axially rearward of quad-seal 114 but is preferably left out of this embodiment. Each of repeller assembly 112 and quad-seal 114 is coaxially affixed to pump shaft 108 and arranged axially between motor 102 and impeller 110. Both quad-seal 114 and repeller assembly 112 function to prevent the fluid being pumped by impeller 110 and to be sealed against from leaking from pump passageways 116 and 118 axially rearward toward motor 102. These barrier sealing devices function to preclude the fluid to be sealed against from attaining undesired contact with both motor 102 and the environment in which pump 100 is operating. It is noted at this time that impeller 110 and repeller assembly 112 define the forward or wet end of pump 100, while motor 102 defines the rearward/dry end of pump 100.

Oil misting or lubricating chamber 120 is disposed axially between quad-seal 114 and motor 102 in order to provide lubrication to conventional rotary bearings 122 and 124 which support pump shaft 108. Bearing assembly 122 is a single row bearing while bearing assembly 124 is a double row bearing.

Double row bearings 124, which are stronger than single row bearings 122, are typically, in the prior art, disposed at a position closely adjacent the motor so as to counteract motor/pump shaft misalignment problems. However, according to this embodiment, double row bearings 124 are positioned considerably axially forward of motor 102 because the problem of motor misalignment has been overcome by the mounting of forward axial end 125 of motor 102 in cut-away or recess area 126 defined in pump casing 101. The provision of double row bearing assembly 124 at a position closely adjacent quad-seal 114 reduces the amount of pump shaft vibration occurring in the quad-seal area of the pump shaft. This provides for added stabilization of quad-seal 114 with respect to pump shaft vibration without increasing the overall axial length of the pump.

Impeller 110 of pump 100 is disposed in volute 128 formed by metal casing portion 130 and radially extending back plate 132. Volute 128 defines chamber 134 having an axial opening 116 forming fluid inlet or in-flow path 136, and a radially extending opening forming fluid outlet or out-flow path 138. As the fluid to be pumped and sealed against flows into volute 128 by way of in-flow opening 116, disk shaped rotating impeller 110 forces a substantial portion of the fluid radially outward through out-flow path 138, the centrifugal force of impeller 110 pumping the fluid.

Impeller 110, which is, as shown, preferably of the conventional closed type, is coaxially affixed to pump shaft 108 and includes a pair of circular facing plates 140 and 141, with a plurality of curved vanes (not shown) interconnecting plates 140 and 141. Alternatively, a conventional open type impeller can be used. Rear plate 141 of impeller 110 is threadedly attached to pump shaft 108, thereby allowing for the impeller to rotate coaxially with the pump shaft.

Screw-type drain plug 148 is provided in the bottom portion of pump casing 130 for allowing an operator to selectively drain interior 134 of volute 128. A plurality of additional drain plugs 150 are provided for draining various other areas of pump 100.

If desired, conventional back-pump vanes (not shown) may be provided in impeller 110 so as to prevent fluid flow toward the repeller during impeller rotation.

While most of the fluid being pumped by impeller 110 will exit volute 128 via out-path 138, some fluid may pass axially behind impeller 110 into narrow passageway 154. The force created by rotation of impeller 110 forces the fluid to be pumped and sealed against through the maze of passageway 154 until it reaches fluid chamber 156 adjacent quad-seal 114. Passageway 154 is formed by the combination of impeller 110 and repeller assembly 112 along with a plurality of inwardly radially extending stationary backplates 132, 158, and 160.

Back plate 132 forms one of the walls of both the first and second vertical portions of passageway 154. The second vertical portion is formed between back plate 132 and the most axially frontward radially extending flange 164 acting as a repeller of repeller assembly 112. Repeller flange 164 is fixed to motor shaft 108 for rotation therewith and extends radially in a substantially perpendicular manner relative to the longitudinal axis of shaft 108. A substantially parallel and identical second repeller flange 166 is integrally formed with first flange 164.

The zig-zag shape of passageway 154 as it winds through the repeller section is a difficult barrier for the fluid to be sealed against to overcome in order to reach quad-seal chamber 156 and ultimately motor 102. The upwardly, downwardly, and horizontally extending passageway 154 elongates the distance which the fluid to be sealed against must travel in order to cause damage to the motor or the environment in which the pump is operating. Because the fluid being pumped will follow the path of least resistance, it will tend to remain in and exit volute 128 rather than traverse the zig-zag portions of passageway 154. However, as discussed above, a small amount of the fluid being pumped will inevitably leak into and travel through passageway 154, resulting in annular chamber 156 adjacent quad-seal 114 being filled.

In addition to the shape of impeller/repeller passageway 154, other structures therein act to prevent the fluid being pumped from reaching chamber 156. Each repeller flange 164 and 166 has a radially extending vane channel arrangement (not shown) defined therein. By rotating repeller assembly 112 including flanges 164 and 166 along with pump shaft 108, most of the fluid attempting to travel through passageway 154 toward motor 102 is forced into these vane channels which results in the fluid reversing direction and traveling back toward impeller 110. It is important that these channels not be completely enclosed. The combination of the liquid being pushed by repeller assembly 112 against back plates 132, 158, and 160 imposes on the liquid an upward spiral motion which expels the liquid back through the vane channels toward the impeller. Back plates 132, 158, and 160 are of course stationary and become a source of friction which is necessary for the liquid to assume the aforesaid spiraling motion.

Fluid (liquid or gas) entering annular quad-seal cavity 156 may do so in a number of ways. The fluid may traverse the entire passageway 154 without entering a cylindrical vane channel (not shown); there could be a failure in repeller assembly 112; the pressure of the fluid entering repeller assembly 112 could be so great so as to overcome the vortex energy generated by the repeller; etc. The bottom line being that eventually, the fluid being pumped often traverses passageway 154 and fills quad-seal chamber 156.

After entering annular chamber 156, the sole barrier between the fluid to be sealed against and oil misting area 120 and motor 102 is quad-seal construction 114. Quad-seal 114 is shown in full by FIG. 1, while FIG. 2 illustrates an enlarged partial cross-sectional view of the top half of the axially frontward portion thereof. The axially rearward half of quad-seal 114 is merely an inversion of the half shown in FIG. 2.

Quad-seal 114 as shown in FIGS. 1–2 includes first and second rotating sealing flanges 200 and 202, respectively. Sealing flanges 200 and 202 are coaxially affixed to pump shaft 108 and rotatable therewith about the central axis of the pump shaft. Each sealing flange 200 and 202 includes a front and rear radially extending surface. The front surface 204 of sealing flange 200 faces the impeller and repeller assemblies (i.e. the wet end of pump 100) and is the first surface of flange 200 to come into contact with the fluid to be sealed against after it makes its way through passageway 154.

Rear radially extending surface 206 of sealing flange 200 faces the dry end of pump 100, i.e. toward motor 102, and includes a pair of annular sealing members 208 and 210 fixedly disposed therein. Flange sealing members 208 and 210 extend circumferentially around pump shaft 108 at substantially constant radii, with the inner diameter of outer flange sealing member 208 being substantially greater than the outer diameter of inner flange sealing member 210.

Because flange sealing members 208 and 210 are annular in design and circumferentially surround shaft 108, they are shown, in FIG. 1, attached to sealing flange 200 both above and below pump shaft 108.

A stationary sealing arrangement, including outer and inner stationary engaging members 212 and 214, respectively, is disposed axially rearward of sealing flange 200. Radially outer engaging member 212 is disposed immediately adjacent flange sealing member 208 so as to provide a fluid sealing contact/interface between the axially rearward surface of flange seal 208 and the forward surface of engaging member 212. Likewise, radially inner stationary engaging member 214 is disposed axially rearward of flange seal 210 so as to provide a similar fluid sealing contact therebetween. Stationary engaging members 212 and 214 are annular in design and circumferentially surround pump shaft 108, engaging members 212 and 214 being disposed at radial distances therefrom corresponding to flange sealing members 208 and 210.

Springs 225 are disposed axially rearward of engaging members 212 and 214 and act as biasing means for continually urging their adjacent engaging members 212 and 214 into sealing engagement with flange seals 208 and 210, respectively. Springs 225 are disposed between, for example, annular L-shaped member 236 and annular member 238. Similar springs are provided adjacent the front surfaces of engaging members 262 and 272, but are not shown in FIG. 1 for purposes of simplicity.

As sealing flange 200 rotates along with pump shaft 108 a fluid seal is created between the engaging surfaces of rotating seals 208, 210 and stationary engaging members 212, 214, respectively.

Each annular engaging member 212, 214, 262, and 272 includes a nose portion and a block portion, the nose portion protruding from the block portion and forming the sealing engagement with the adjacent flange seal. Engaging member 212 for example, includes nose portion 244 extending outward from block portion 246. Likewise, engaging member 214 includes nose portion 258 and block portion 256.

As the fluid to be sealed against flows into chamber 156 via passageway 154, it first comes into contact with the front surface 204 of sealing flange 200. The fluid then flows radially outward along the front surface of flange 200 until it reaches the outer periphery thereof, the fluid then proceeding axially rearward and radially inward along rear surface 206 of the sealing flange. The fluid to be sealed against finally comes into contact with the rotating seal maintained between nose portion 244 of engaging member 212 and flange seal 208 (i.e. the first of the four rotating seals making up quad-seal 114). As the radially inward flow of the fluid is halted by this seal, the fluid proceeds axially rearward along stationary annular support 242 until it reaches neck passageway 216 through which it flows, the fluid finally coming into contact with the radially outer peripheral surface of annular diaphragm 218.

Diaphragm 218, along with the other three annular quad-seal diaphragms 219–221, is made of a flexible rubber material having a stiffening member 222 disposed therein and extends circumferentially around pump shaft 108. As the fluid to be sealed against contacts the radially outward side or periphery of diaphragm 218, the amount of force exerted thereon determines the amount of force to be placed by diaphragm 218 on the rear surface of annular support member 224. The more force placed on support 224 by diaphragm 218, the tighter the sealing engagement between members 208 and 212. As the fluid pressure in chamber 156 increases thereby forcing diaphragm 218 to flex radially inward, diaphragm 218 exerts additional pressure on the rear surface of support member 224 which in turn further urges the sealing engaging surface of engaging member 212 into sealing contact with the rear surface of flange seal 208. In other words, the net effect of the radially inward flexing of diaphragm 218 is to further bias the forward surface (i.e. nose portion) of engaging member 212 into sealing engagement with the rear surface of annular flange seal 208. Diaphragms 219–221 function in the same manner.

Stationary annular engaging members 212 and 214 are stabilized against radial movement by annular supporting/stiffening bands 226 and 228. As is the case with engaging members 212 and 214, annular support bands 226 and 228 circumferentially surround pump shaft 108, support bands 226 and 228 being disposed radially outward of their adjacent stationary engaging members 212 and 214, respectively. Support bands 226 and 228 are preferably made of a metal material. They are heated to extreme temperatures and thereafter wrapped around the radially outer periphery of engagement members 212 and 214, respectively. When allowed to cool, supporting bands 226 and 228 contract thereby providing a tight sealing fit between themselves and stationary engaging members 212 and 214, respectively. The presence of bands 226 and 228 stabilizes engaging members 212 and 214 against radially outward movement, thereby creating a more stabilized sealing engagement between the engaging members and their respective flange seals 208 and 210.

Flange seals 208 and 210 are preferably held in position and stabilized against radial movement by annular rubber members 230 mounted within flange 200. Rubber members 230 are positioned on both radial sides of each flange sealing member 208 and 210.

The sealing engagement between the axially front surfaces of engaging members 212 and 214 and the rear surfaces of flange seals 208 and 210 is highly sensitive to pressure variations affecting both the engaging members and the flange seals. For example, a sufficient pressure directed upon certain areas of an engaging member can often create a moment about which the member is forced to rotate thereby disrupting the sealing engagement between the member and its corresponding flange seal. Accordingly, the quad-seal 114 of this embodiment is provided with a pressure stabilizing design which is described below.

Fluid sealed temperature stabilizing annular chamber 234 is disposed radially between stationary engaging members 212 and 214. Chamber 234 extends from the radially inner surface/periphery of diaphragm 218 to the radially outer surface/periphery of diaphragm 219, and from the radially inner periphery of engaging member 212 to the radially outer periphery of engaging member 214. Chamber 234 may selectively be pumped full of a clean or environmentally safe temperature stabilizing barrier fluid (e.g. water, mineral oil, Glycol, or combination thereof) so as to allow the radial pressure exerted on diaphragm 218 and stationary engagement member 212 by the fluid to be sealed against in chamber 156 to be at least partially offset or equalized by the pressure of the barrier fluid in chamber 234.

Figure 5:
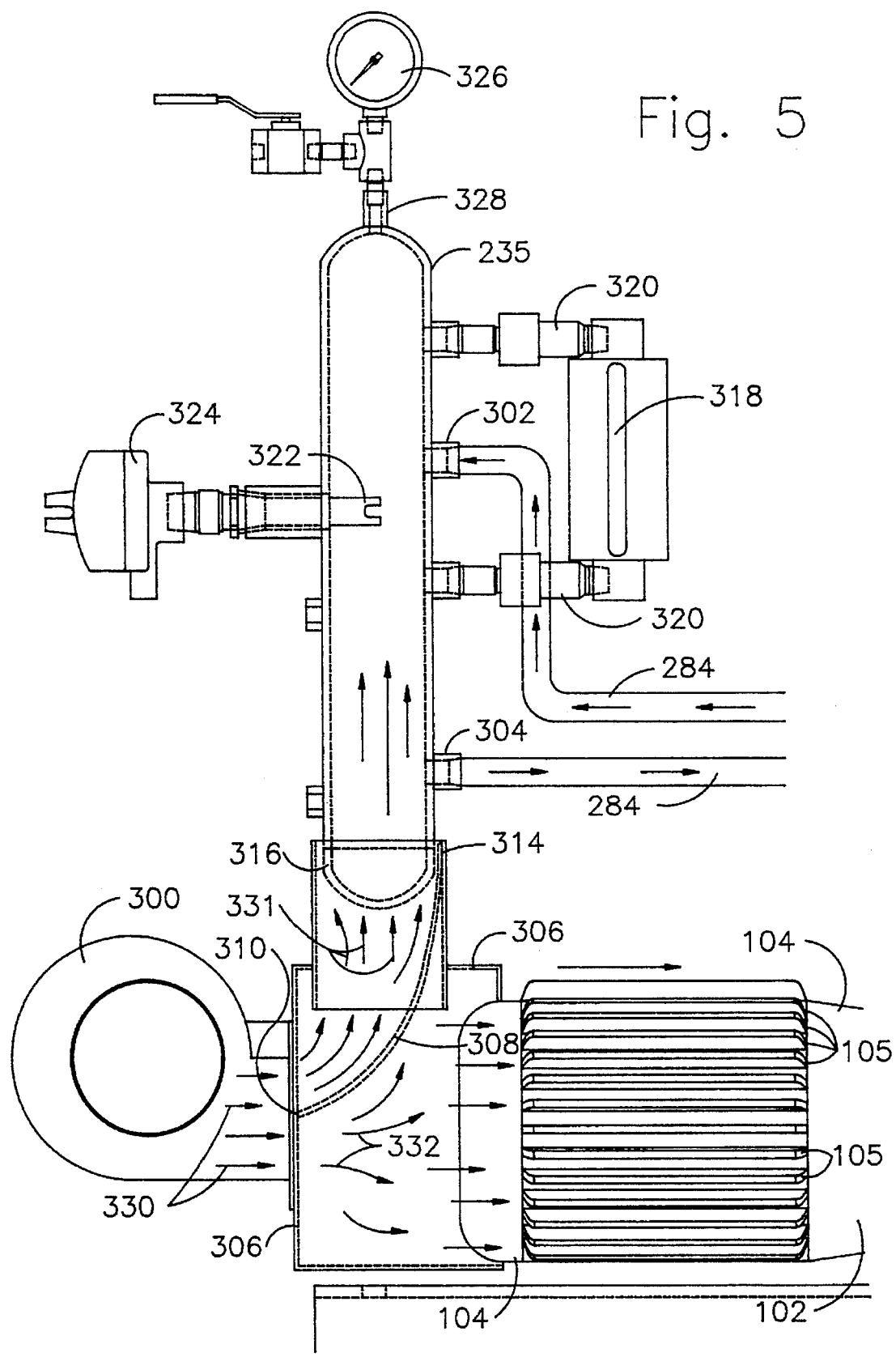
FIG. 5 is a side elevational view of the motor, barrier tank, and corresponding blower of the aforesaid pump system embodiment of this invention.

This barrier fluid is communicated into chamber 234 as by remotely located barrier tank 235 and a conduit system disposed therebetween (see FIG. 5). The barrier fluid, preferably a liquid, in chamber 234 is preferably maintained at a pressure which substantially offsets to some extent the radially inward flexing of diaphragm 218 created by the pressure of the fluid to be sealed against in chamber 156, the barrier fluid contacting the inner peripheral surface of diaphragm 218 by way of a passageway defined between L-shaped member 236 and diaphragm support member 238.

The barrier fluid in chamber 234 also acts to substantially offset or equalize both the radial and axial pressures exerted on engagement member 212 by the fluid to be sealed against present in chamber 156. The often hazardous fluid in chamber 156 inevitably makes its way into and through passageway 240 defined between the combination of engagement member 212 and annular support band 226, and annular support 242. The fluid flows radially outward from nose portion 244 of engaging member 212 through passageway 240 until it reaches the axially extending portion of annular member 242. Then, the fluid flows axially rearward through passageway 240 defined between annular member 242 and support band 226. Upon coming into contact with the radially extending front surface of support member 224, the fluid to be sealed against proceeds radially inward through a passageway defined between the rear surface of block portion 246 of engaging member 212 and the front surface of support member 224. The fluid to be sealed against proceeds radially inward through this passageway until it reaches and is stopped by oval-shaped rubber member 248.

As a result, the fluid to be sealed against surrounds the radially outward peripheral surfaces of both the nose 244 and block 246 portions of engaging member 212, necessarily directing a radially inward pressure thereon. Furthermore, the fluid to be sealed against present in passageway 240 exerts an axially rearward pressure on the forward facing surface of block portion 246, while the fluid present in the passageway defined between support member 224 and block portion 246 directs an axially forward pressure on block portion 246.

The block and nose design of engagement member 212 allows the two axially directed pressures (i.e. rearward and frontward) exerted by the fluid to be sealed against upon the front and rear facing surfaces of block portion 246 to be substantially offset or equalized. They are offset because the fluid passageway extending along the rearwardly facing surface of block portion 246 extends radially inward only approximately to an extent equivalent to the radially inward extent of the front surface of block 246 which is ended by the outer periphery of nose portion 244. Because the fluid to be sealed against exerts axial pressures upon the rear and front surfaces of block portion 246 along substantially equal radially inward extending areas, these axial pressures are substantially offset or equalized by one another.

Likewise, the rearwardly directed axial pressure exerted on the front surface of block portion 246 by the barrier fluid in chamber 234 is substantially offset by the frontwardly directed axial pressure exerted on the rear surface of block portion 246 by the barrier fluid present in passageway 250 defined between support member 224 and the radially inward rear surface of block portion 246. Like the fluid to be sealed against present in the opposing passageway along the rear surface of block portion 246, the barrier fluid present in passageway 250 has its radially outward flow halted by the presence of rubber biasing member 248. Accordingly, the frontward and rearward axially directed fluid pressures exerted on block portion 246 of engaging member 212 are substantially equalized or offset due to the structural design of and fluid passageways surrounding engaging member 212.

As can be seen in FIG. 2, the radially inward and outward directed pressures exerted on nose portion 244 and block portion 246 of engaging member 212 are also substantially equalized or offset by one another. The fluid to be sealed against present in chamber 156 exerts an inwardly directed radial pressure along the radially outer surface of nose portion 244. This pressure created by the fluid to be sealed against is substantially offset by the radially outward directed pressure exerted on the nose portion by the barrier fluid present in chamber 234. In a similar manner, the fluid to be sealed against present in the axially extending portion of passageway 240 also imparts an inwardly directed radial pressure on block portion 246. This pressure is substantially offset by the radially outward directed pressure exerted on the inner periphery of block portion 246 by the temperature stabilizing barrier fluid disposed in chamber 234. Accordingly, both the radial and axial pressures directed by the different fluids on stationary engagement member 212 are substantially equalized and offset due to the structural design of this embodiment.

The rotation of flange seal 208 along with flange 200 imparts a rearwardly directed axial pressure upon the front surface of nose portion 244. This axial pressure is substantially offset and equalized by the forwardly directed axial pressure exerted on the rear surface of block portion 246 by rubberized biasing member 248.

By equalizing and offsetting substantially all of the pressures directed upon engaging member 212 (and the other three annular engaging members), the position of engaging member 212 is kept substantially constant thereby maintaining the flat sealing engagement between the front surface of nose 244 and the rear surface of flange seal 208. If the block or nose portion of any stationary engaging member (or flange seal) is caused to tilt in any direction, ever so slightly, the planar sealing engagement between the front surface of nose portion 244 and the rear surface of seal 208 will break down and allow the fluid to be sealed against to seep therethrough. It is therefore important to offset and equalize the various fluid pressures exerted upon stationary engaging member 212 (and the other engaging members 214, 262, and 272) so that its axial and radial position relative to the other quad-seal elements is maintained.

The radial pressures directed upon flange seal 208 (and the other three flange seals) are substantially equalized/offset in a similar manner. Opposing passageways 207 are provided on each radial side of flange seal 208. Rubber members 230 stop the flow of fluid through these passageways and allow the radially directed pressure from one passageway to substantially offset the radial pressure exerted by the fluid in the other passageway 207.

The axial and radial pressures directed upon the radially inward stationary engaging member 214 are substantially equalized and offset in a similar fashion. The axially rearward directed pressure exerted upon the front surface of annular support band 228 is substantially offset by the axially forward directed pressure exerted upon the rearwardly facing surface of band 228 by the barrier fluid present in passageway 252. Passageway 252 is defined between the axially forward surface of annular support member 254 and the axially rearward facing surfaces of annular support band 228 and block portion 256.

Another annular fluid sealed temperature stabilizing barrier chamber 260 circumferentially surrounding pump shaft 108 is disposed radially inward of stationary engaging member 214. Chamber 260 includes an elongated axially extending portion (passageway) defined between and interfacing the rear surface 206 of sealing flange 200 and the front surface of sealing flange 202. This elongated passageway of chamber 260 is substantially parallel to pump shaft 108 and communicates with the sealing surfaces of stationary engaging members 214 and 262. A temperature stabilizing barrier fluid may be selectively pumped into chamber 260 by way of a conduit (not shown) so as to maintain a temperature and pressure in chamber 260 which will substantially offset the pressure exerted by the barrier fluid (or fluid to be sealed against if it leaks through the first seal of members 208 and 212) on member 214 in fluid sealed chamber 234 and maintain the 214,210 seal at an acceptable temperature.

The radially inward directed pressure on the outer peripheral surface of annular support band 228 by the fluid in chamber 234 is substantially equalized and offset by the radially outward directed pressure exerted upon the inner periphery of block portion 256 of engagement member 214 by the fluid of chamber 260 present in passageway 264 defined between the inner periphery of block portion 256 and the outer periphery of annular support member 266.

Likewise, the radially inward directed pressure on nose portion 258 by the fluid in chamber 234 is substantially offset by the radially outward directed pressure exerted on the inner periphery of nose portion 258 by the fluid present in annular chamber 260 (assuming, of course, that the two fluids are maintained at substantially the same pressure, which they preferably are). The axial pressures exerted on block portion 256 are offset in a similar manner as those described above with respect to block portion 246 of engaging member 212. Also, the axial pressures placed upon engaging member 214 by rotating flange seal 210 and rubberized biasing member 270 substantially offset one another.

The other or axially rearward top half of quad-seal 114 which is not shown in FIG. 2 includes stationary annular engaging members 262 and 272 (see FIG. 1). The rear surfaces of the nose portions of engaging members 262 and 272 sealingly engage rotating flange seals 274 mounted on the front surface of sealing flange 202. The arrangement of engaging members 262 and 272 and their respective diaphragms 220 and 221 relative to sealing flange 202 is an inverted replica of the front half of quad-seal 114 shown in FIG. 2. The only difference being that the sealing surface of sealing flange 202 faces the wet end of pump 100, instead of the dry end faced by the sealing surface of flange 200.

Turning now to the temperature stabilizing aspect of the seal construction of this embodiment shown in FIGS. 1–8, the temperature stabilizing barrier fluid (preferably a liquid) disposed within annular chamber 234 (and chamber 291) is maintained at a substantially constant temperature by way of a circulatory system including stationary chamber exit orifices 280, chamber exit conduits (or pitot tubes) 282, circulatory conduits 284, barrier tank(s) 235, chamber entry conduits 286, and chamber entry orifices 288 shown in FIGS. 1–4. Barrier fluid/cooling fluid tank 235 is shown in FIG. 5 with conduits 284 affixed thereto. In one preferred embodiment, a separate barrier tank 235 is connected via conduits 284 to each chamber 234 and 291 as shown in FIG. 3(b). Alternatively, in another preferred embodiment, both chambers 234 and 291 are connected to the same barrier tank as shown in FIG. 3(a).

Figure 3A:
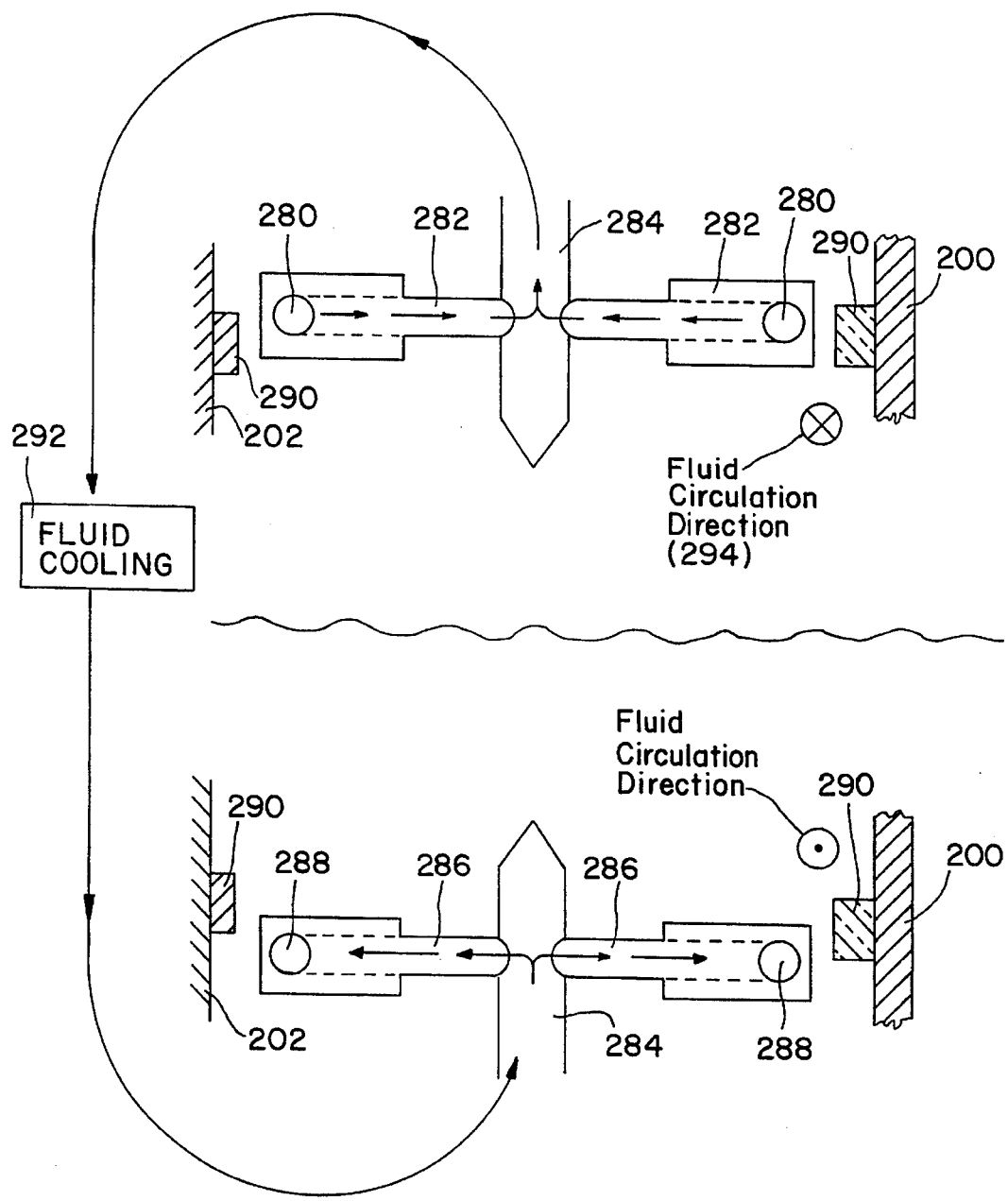
FIG. 3(a) is a schematic diagram illustrating a preferred embodiment of the temperature stabilizing liquid circulation system of the aforesaid pump system.

As shown, chamber exit orifices 280 and chamber entry orifices 288 are defined in the periphery of exit and entrance conduits or pitot tubes 282 and 286, respectively. Orifices 280 and 288 are disposed adjacent the longitudinal ends of their respective exit and entrance conduits 282 and 286, respectively, the orifices being positioned within annular temperature stabilizing chambers 234 and 291 disposed adjacent sealing flanges 200 and 202, respectively. As shown in FIGS. 1, 3(a), (b), and 4, exit and entrance orifices 280 and 288, respectively, are arranged in chamber 234 (and 291) approximately 180° apart and facing the same direction, the direction in the aforesaid figures being out of the page. Because orifices 280 and 288 face the same direction, they face opposite flow directions within annular chambers 234 and 291.

Figure 3B:
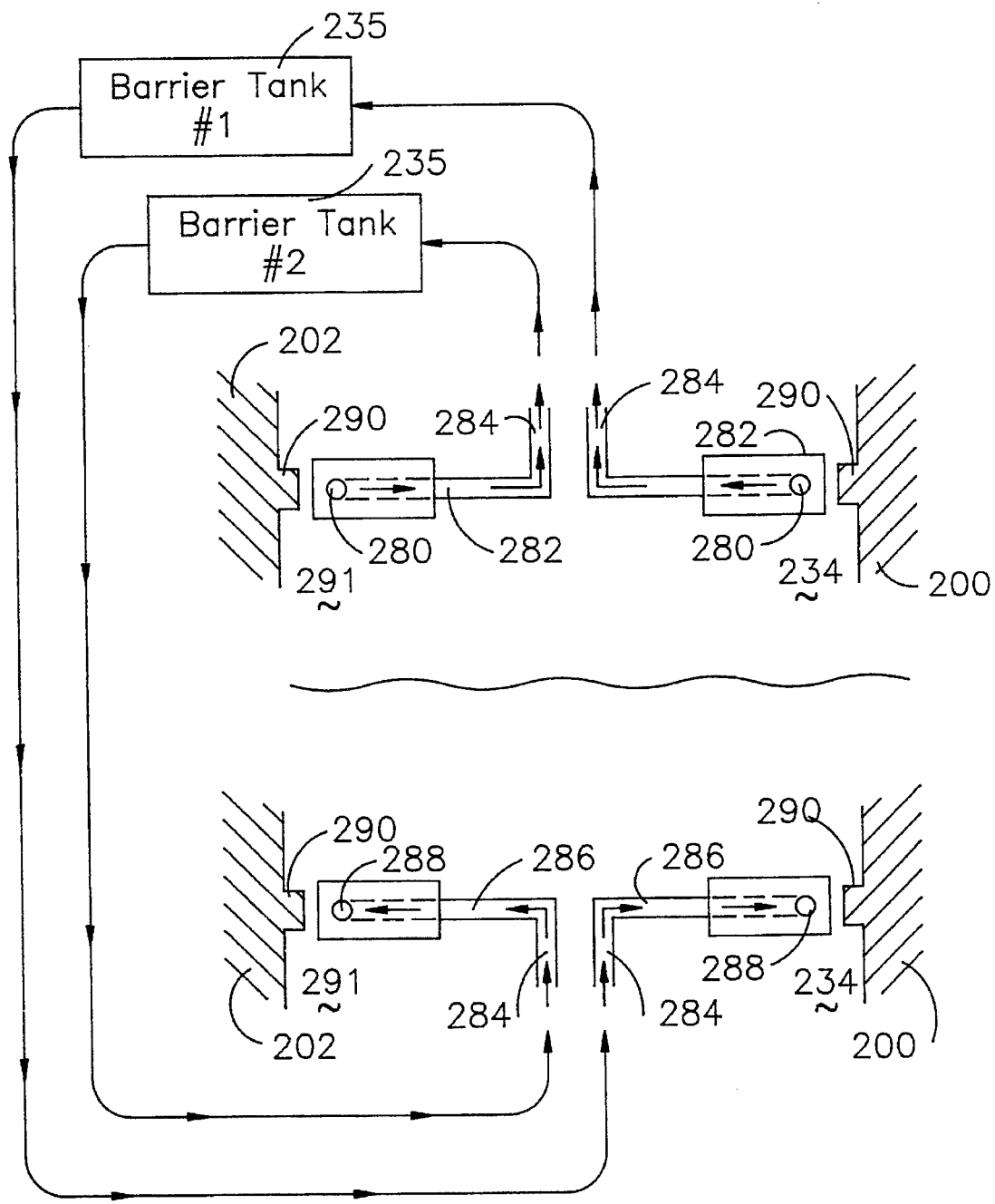
FIG. 3(b) is a schematic diagram illustrating another preferred embodiment of the circulation system of the aforesaid pump system.

Another important component in the fluid circulating system of this embodiment is the disposition of pumping vanes 290 on the sealing side surfaces of sealing flanges 200 and 202 as shown in FIGS. 2, 3(a), and 3(b). Vanes 290 are preferably integrally formed with sealing flanges 200 and 202. Alternatively, vanes 290 could be affixed to the sealing flanges by way of conventional screws, welds, etc.

Pumping vanes 290 are provided on the rear radially extending surface of forwardmost sealing flange 200. The radial disposition of vanes 290 is between flange sealing members 208 and 210, or in other words, within annular temperature stabilizing barrier chamber 234. Therefore, the rotation of sealing flange 200 and vanes 290 thereon affects only the barrier/cooling fluid present within chamber 234, not the fluid to be sealed against located in chamber 156.

Due to the rotation of vanes 290 in conjunction with pump shaft 108, the fluid present within annular chamber 234 is caused to flow circumferentially around pump shaft 108 through annular chamber 234. For example, as shown in FIGS. 1–4, if sealing flanges 200 and 202, as viewed from the dry or motor end of the pump are rotated along with pump shaft 108 in a counterclockwise direction 294 (see FIG. 4), the preferably clean temperature stabilizing fluid present in chambers 234 and 291 will be forced/pumped to flow circumferentially around pump shaft 108 through chamber 234 (and of course chamber 291) by vanes 290, also in the counterclockwise direction. In other words, the barrier/cooling fluid adjacent exit orifices 280 will be forced to flow into the paper as shown in FIGS. 1–3 by the rotation of pumping vanes 290. Accordingly, the fluid within annular chamber 234 disposed adjacent chamber entry orifices 288 will be forced to flow out of the paper as shown in FIGS. 1 and 3.

Because the openings of chamber exit orifices 280 face the counterclockwise fluid flow direction 294, when the barrier/cooling fluid in chamber 234 is forced to move in this direction 294 it is forced into orifices 280 as illustrated by reference numeral 295 in FIG. 4. The continual rotation of sealing flanges 200 and 202 in counterclockwise direction 294 as viewed from the motor end of the pump continually forces the fluid within chambers 234 and 291 into exit orifices 280. After being forced into orifices 280, the fluid is thereafter forced axially through chamber exit conduits 282 and radially outward through circulatory conduits 284, a separate conduit 284 preferably communicating with each chamber 34 and 291 as shown in FIG. 3(b). After leaving fluid chambers 234 and 291 by way of exit orifices 280, exit conduits 282, and circulatory conduit(s) 284, the barrier/cooling fluid flows into and is cooled (or heated in exceptional circumstances) within barrier tank(s) 235 (see FIG. 5) and is thereafter circulated by way of conduit(s) 284 back into annular temperature stabilizing chambers 234 and 291 via entry conduits 286 and entry orifices 288. By pumping/circulating the barrier/cooling fluid within chambers 234 and 291 to and from temperature stabilizing tank(s) 235 by utilizing pumping vanes 290, there no longer exists a need for a separate pump for circulating the temperature stabilizing fluid.

Because the openings of chamber entry orifices 288 face the clockwise flow direction, fluid flowing circumferentially in direction 294 through chambers 234 and 291 is not forced thereinto by pumping vanes 290. In fact, the counterclockwise flow of barrier/cooling fluid in chambers 234 and 291 creates a vacuum-type effect which draws the cooled or temperature stabilized fluid from chamber entry orifices 288. The fluid is forced or drawn therefrom as shown by arrow 296 in FIG. 4 back into chambers 234 and 291. In this manner, the temperature of the barrier fluid within annular chambers 234 and 291 is maintained substantially constant at an acceptable level thereby eliminating significant temperature fluctuations which have adverse effects on the sealing engagement of engaging members 212, 214, 262, and 272 with flange seals 208, 210, and 274, respectively. By maintaining a relatively constant temperature within chambers 234 and 291, the temperature of the adjacent rotating seals is prevented from significantly fluctuating and reaching heightened operating levels which create substantial seal problems thereby allowing the seal to break down.

FIG. 5 is a side elevational view of barrier tank 235, motor 102, and blower 300 of the pump system of the aforesaid embodiment. The barrier or temperature stabilizing fluid leaving chamber 234 and/or 291 by way of exit orifices 280 proceeds through conduit 284 until reaching barrier/coolant tank inlet port 302. After being stabilized (preferably cooled) within tank 235, the barrier fluid returns to temperature stabilizing chamber(s) 234 and/or 291 by way of tank outlet conduit 304 and flow conduit 284. FIGS. 3(a) and 3(b) show two preferred embodiments of this circulation system, FIG. 3(a) showing both chambers 234 and 291 communicating with a single tank 235, and FIG. 3(b) showing each chamber 234 and 291 communicating with a separate tank 235.

Blower 300 is fixedly attached to cowl 306, cowl 306 being disposed between blower 300 and motor housing 104. Blower 300, preferably a conventional squirrel cage blower, blows air into cowl 306 which includes baffle 308 for splitting the air flow into two separate portions, the first portion being directed around and across the exterior periphery of motor housing 104 and the second portion being directed upward through cowl outlet or chimney 314 across the exterior of barrier tank 235. In such a manner, blower 300 acts to simultaneously stabilize the temperature (preferably cool) of both motor 102 and the barrier/temperature stabilizing fluid disposed within tank 235.

Motor housing 104 includes a plurality of elongated guide fins 105 formed in its exterior periphery, these fins 105 for directing the flow of air originating from blower 300 across motor housing 104 so as to more efficiently cool motor 102 and maintain it at an acceptable operating temperature.

Figure 6:
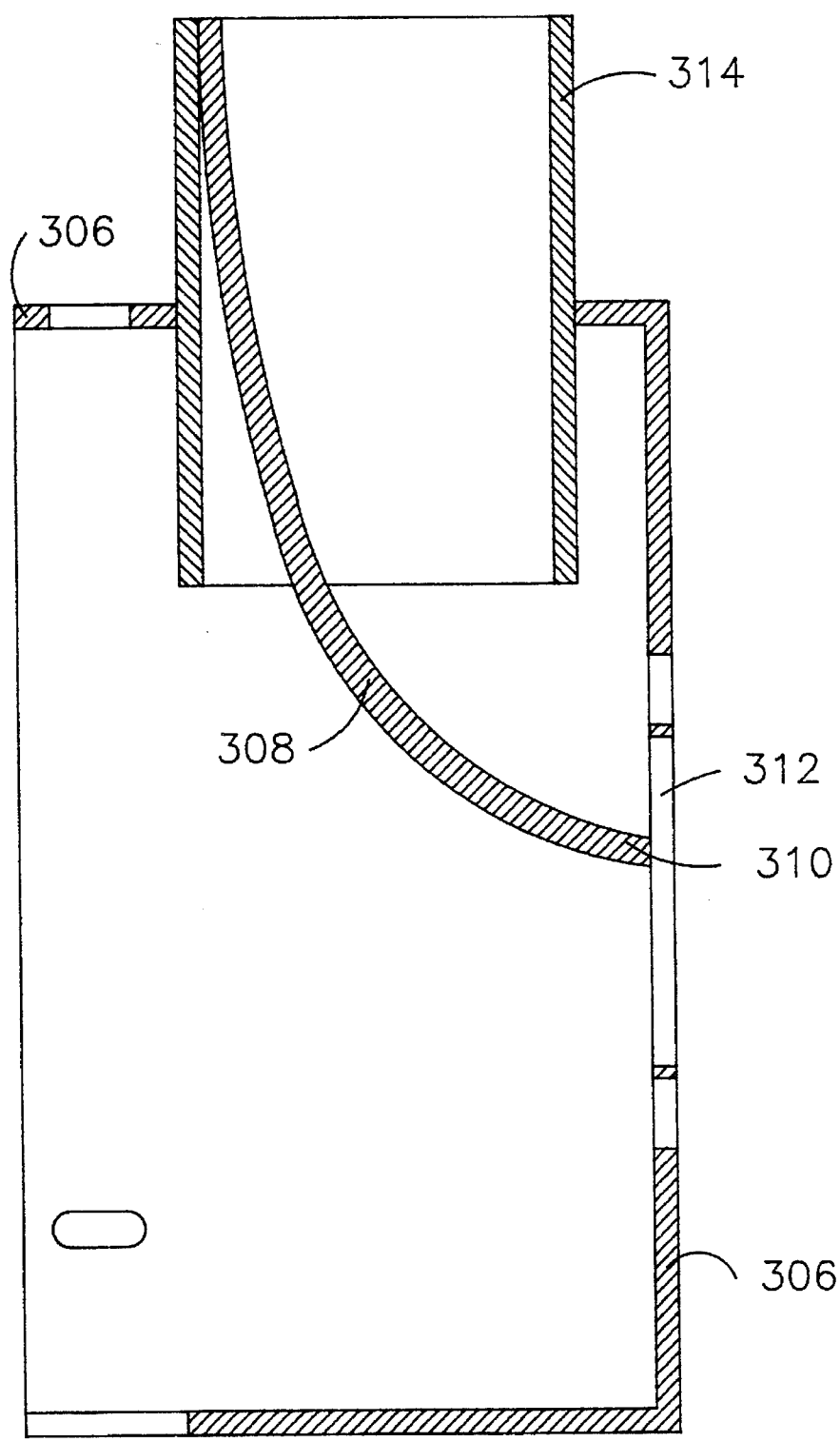
FIG. 6 is a side elevational view of the cowl disposed between the motor and blower of the aforesaid pump system embodiment of this invention, as viewed from the side opposite that shown in FIG. 5.

Cowl 306, more fully shown in FIGS. 6–8, includes baffle or deflector 308 affixed thereto, baffle 308 having a curved or elliptical design and being connected at one end to the top of chimney 314 and at the other end adjacent aperture 312 through which blower 300 blows it air. Lower end 310 of cowl 306 is provided closely adjacent blower 300 and slightly above the center line of aperture 312. Accordingly, cowl 306 and deflector/baffle 308 provided therewith preferably direct a larger amount of cooling air across motor housing 104 than toward barrier/cooling tank 235.

Blower 300 directs its air flow through cowl 306 across motor housing 104 in such a manner that the velocity of air flow across housing 104 through fins 105 is preferably about 1,500 feet per minute. The remaining air originating from blower 300 is directed upward by deflector/baffle 308 and out of chimney 314 so as to flow across the exterior periphery of barrier tank 235 thereby preferably cooling the temperature stabilizing fluid from chambers 234 and 291 disposed therein. Chimney or outlet port 314 of cowl 306 preferably surrounds lower portion 316 of one or more tanks 235 thereby enabling the air to be directed more closely adjacent the exterior of tank(s) 235 so as to more efficiently cool (or heat under some circumstances) the tank(s) and barrier fluid therein.

While squirrel cage blower 300 is affixed to cowl 306, the cowl may or may not be directly affixed to motor housing 104. In a preferred embodiment of this invention, cowl 306 is affixed to housing 104 as by conventional fasteners.

Each barrier/temperature stabilizing fluid tank 235 is provided with sight glass 318 affixed thereto as shown in FIG. 5. The fluid within tank 235 reaches sight-glass 318 by way of conduits 320 communicating the interior of tank 235 with glass tube portion 318. Sight-glass 318 enables an operator to quickly view the fluid level currently within tank 235 so that he may accordingly either adjust that level or shut down the system if the level is too low or too high.

Each tank 235 is further provided with conventional liquid level sensor 322, the sensor being disposed within the interior of tank 235. Alarm 324 is coupled to liquid level sensor 322 such that when the barrier/cooling fluid/liquid within tank 235 drops below a predetermined level, alarm 324 will be sounded, thereby indicating the problem to an operator. Optionally, alarm 324 can be coupled to a pump shut-off system for turning off motor 102 and halting pump operations when sensor 322 indicates that the fluid level within tank 235 has dropped below a predetermined point.

Each tank 235 is further provided with gas buffer gauge 326 and gas inlet/outlet port 328. Gauge 326 shows an operator the pressure within tank 235, which in turn indicates the pressure within barrier chambers 234, 291, and/or optionally 260. Inert gas (e.g. nitrogen) may be introduced into tank 235 by way of port 328 so as to selectively adjust the pressure within both tank 235 and barrier/temperature stabilizing chambers 234, 260, and 291. In such a manner, the pressure on the barrier fluid side of the rotating seals making up quad-seal 114 can be maintained at a value, for example, substantially equal to the pressure in, for example, chamber 156. The pressure within the barrier chambers can, of course, also be maintained at a level higher than that of adjacent fluid to be sealed against chambers (e.g. chamber 156) so that the fluid to be sealed against is prevented from entering into the barrier chambers having such high pressures. It is noted that such pressure via port 328 may be introduced into tank 235 and chambers 234, 260, and 291 regardless of whether fluid is present therein.

The barrier fluid preferably disposed within chambers 234 and 291 (and optionally chamber 260) via conduits 284 and tank 235 is preferably water. However, other liquids such as mineral oil, glycol, and combinations of water therewith may also be used. The temperature at which these barrier/temperature stabilizing/cooling fluids are preferably maintained depends on the environment in which the pump system is being used. For instance, this temperature depends in part upon the type of fluid being pumped, the type of barrier/temperature stabilizing fluid being used, the rate at which motor 102 is being run, the temperature of the fluid being pumped, etc.

Each tank 235 is preferably designed to hold one-half to five gallons of barrier/temperature stabilizing liquid, and most preferably is designed to hold about one gallon. Tank 235 and chambers 234 and/or 291 are preferably originally filled such that the liquid level within each tank 235 is about one inch below the top of sight glass 318.

Furthermore, while FIG. 5 shows only one barrier tank 235, a plurality of such tanks are used in the FIG. 3(b) embodiment of this invention. One tank 235 may communicate with chamber 234 while another identical tank 235 is coupled to chamber 291 via separate conduits 284 so that if the hazardous fluid to be sealed against happens to leak into chamber 234, chamber 291 and its barrier tank would not be contaminated. A third tank 235 could be provided for chamber 260 in a similar manner.

While blower 300 is preferably of the squirrel cage blower type, a conventional axial fan could also be used in its place with its air flow being divided into two portions as by cowl 306 and baffle 308 affixed thereto.

In a typical operation of the pump system of the aforesaid embodiment shown in FIGS. 1–8, the often hazardous fluid to be pumped and sealed against enters volute 128 by way of in-flow path 136. Impeller 110 forces most of the fluid out of volute 128 via out-flow path 138. However, a portion of the fluid being pumped inevitably slips behind back plate 141 of impeller 110 and enters passageway 154. Due to the centrifugal force created by impeller 110, the fluid to be sealed against present in passageway 154 makes its way axially rearward toward chamber 156 and motor 102 through the zig-zag configuration of passageway 154, most clearly shown in FIG. 1. A portion of the fluid to be sealed against entering passageway 154 is not repelled therefrom by the repeller assembly 112. This portion of the fluid to be sealed against makes its way through passageway 154 proceeding past inwardly disposed back plates 132, 158, and 160 and past disk or flange members 164 and 166 of repeller assembly 112.

The portion of the fluid to be sealed against which makes its way through passageway 154 enters quad-seal chamber 156, circumferentially surrounds pump shaft 108, and comes into contact with front radially extending planar surface 204 of sealing flange 200. Flange 200 is coaxially affixed to pump shaft 108 and rotates therewith. The fluid to be sealed against proceeds radially outward along the front surface 204 of rotating flange 200 before reaching its outer periphery. Then, the fluid proceeds axially rearward toward motor 102 and thereafter moves radially inward along back surface 206 of sealing flange 200. The fluid to be sealed against then reaches the first of the four annular rotating seals making up quad-seal arrangement 114.

The first annular rotating seal encountered by the fluid to be sealed against includes rotating flange seal 208 and stationary engaging member 212. The rotating rear surface of flange seal 208 forms a sealing engagement with the front surface of nose portion 244 of stationary engaging member 212. The seal formed therebetween blocks the radially inward flow of the fluid to be sealed against and forces the fluid to continue axially backward toward motor 102 along the outer radial surface of annular support 242.

The fluid to be sealed against then comes to neck portion 216 and proceeds radially inward therethrough coming into engagement with the outer periphery of flexible diaphragm 218. As the fluid pressure in chamber 156 increases due to the influx of the fluid to be sealed against thereinto, diaphragm 218 is forced to flex radially inward thereby imparting a larger force on the rear surface of support member 224 which in turn presses the front surface of nose portion 244 into a tighter sealing engagement with the rear surface of flange seal 208. In other words, diaphragm 218 determines the amount of force to be placed on the rearward surface of engaging member 212 by the fluid to be sealed against, diaphragm 218 being disposed in such a manner that an increase in pressure of the fluid to be sealed against in chamber 156 upon the outer periphery of diaphragm 218 causes the diaphragm to flex radially inward thereby further urging the forward surface of engaging member 212 into sealing engagement with the rear surface of rotating seal 208.

Annular L-shaped member 236 is positioned so as to limit the radially inward flexing of diaphragm 218 thereby limiting the amount of force which may be placed by the fluid to be sealed against upon diaphragm 218 and the rear surface of engaging member 212.

The fluid to be sealed against, upon reaching the radially outward annular surface of nose portion 244 will pass axially rearward therealong and radially outward through passageway 240 defined between engaging member 212 and support member 242. The fluid to be sealed against makes its way radially outward and axially rearward through passageway 240 until it reaches a position adjacent the front radially extending surface of support member 224. At this point, the fluid to be sealed against has nowhere to go but radially inward through a radially extending passageway defined between member 224 and the rear surface of block portion 246. The fluid's radially inward movement through this passageway is stopped by rubberized biasing member 248 at a radial extent substantially equivalent to the radial position of the top or radially outer surface of nose portion 244.

Therefore, the pressure exerted on the rear surface of engaging member 212 and block portion 246 thereof by the fluid to be sealed against present in chamber 156 is substantially offset by the axially rearward directed pressure exerted on the front surface of block portion 246 in passageway 240 by the fluid to be sealed against. In other words, the pressures directed on engaging member 212 in the axial directions by the fluid to be sealed against substantially offset one another. The radially inward pressure exerted on the radially outer peripheral surface of band member 226 is substantially offset by the radially outward directed pressure exerted on the radially inward peripheral surface of block portion 246 by the fluid (preferably clean barrier/temperature stabilizing liquid) disposed in chamber 234.

Also, even if chamber 234 was vacant, due to the pressure exerted along the full axial length and full outer circumference of members 226 and 244, this design provides even loading. In other words, there is no cantilever effect.

Furthermore, the axially rearward pressure directed on the front surface of nose portion 244 by the rotational engagement with the rear surface of seal 208 is substantially offset and equalized by the axially forward biasing force placed upon the rear surface of block portion 246 by rubber biasing member 248. Similar oval-shaped rubber biasing members perform the same function with respect to the other three annular stationary engaging members 214, 262, and 272.

Clean barrier/temperature stabilizing fluid (preferably a liquid) is selectively introduced into chamber 234 (and chamber 291, optionally chamber 260) by way of tank(s) 235, circulating conduit(s) 284, pitot tube conduit(s) 282, and orifice(s) 280, 288. The barrier fluid is preferably maintained at a pressure which allows it to substantially offset the radially and axially directed pressures created by the fluid to be sealed against in chamber 156 upon engaging member 212 and diaphragm 218. The pressure at which the barrier fluid is to be maintained is adjustable as by the introduction or removal of inert gas from tank(s) 235 through port(s) 328.

After the barrier fluid is initially introduced into chamber 234, the amount and pressure of the barrier fluid is substantially maintained, and the temperature of the barrier fluid is substantially maintained by circulating it to and from chamber 234 (and chamber 291) by way of chamber exit orifice 280 and chamber entrance orifice 288 (assuming counterclockwise shaft 108 rotation), the fluid being recirculated back into chamber 234 after it is cooled in tank 235. Vanes 290 affixed to the rear surface of rotating sealing flange 200 create a fluid flow (circumferentially around pump shaft 108) of the barrier/temperature stabilizing fluid through annular chamber 234 in either the clockwise or counterclockwise direction, depending upon which direction pump shaft 108 is rotated. If, for example, pump shaft 108 is rotated in a counterclockwise direction 295 as viewed from the motor or dry end of the pump, the fluid within chamber 234 is forced to flow in counterclockwise direction 294 through chamber 234 (and chamber 291 if fluid is present therein) circumferentially around pump shaft 108. If the barrier/cooling fluid is forced to rotate in such a counterclockwise manner, orifice 280 becomes the chamber exit orifice because the fluid is forced directly into orifice 280 as indicated by reference numeral 295 in FIG. 4, and out of chamber 234 by way of conduit 282 toward barrier temperature stabilizing tank 235.

Figure 4:
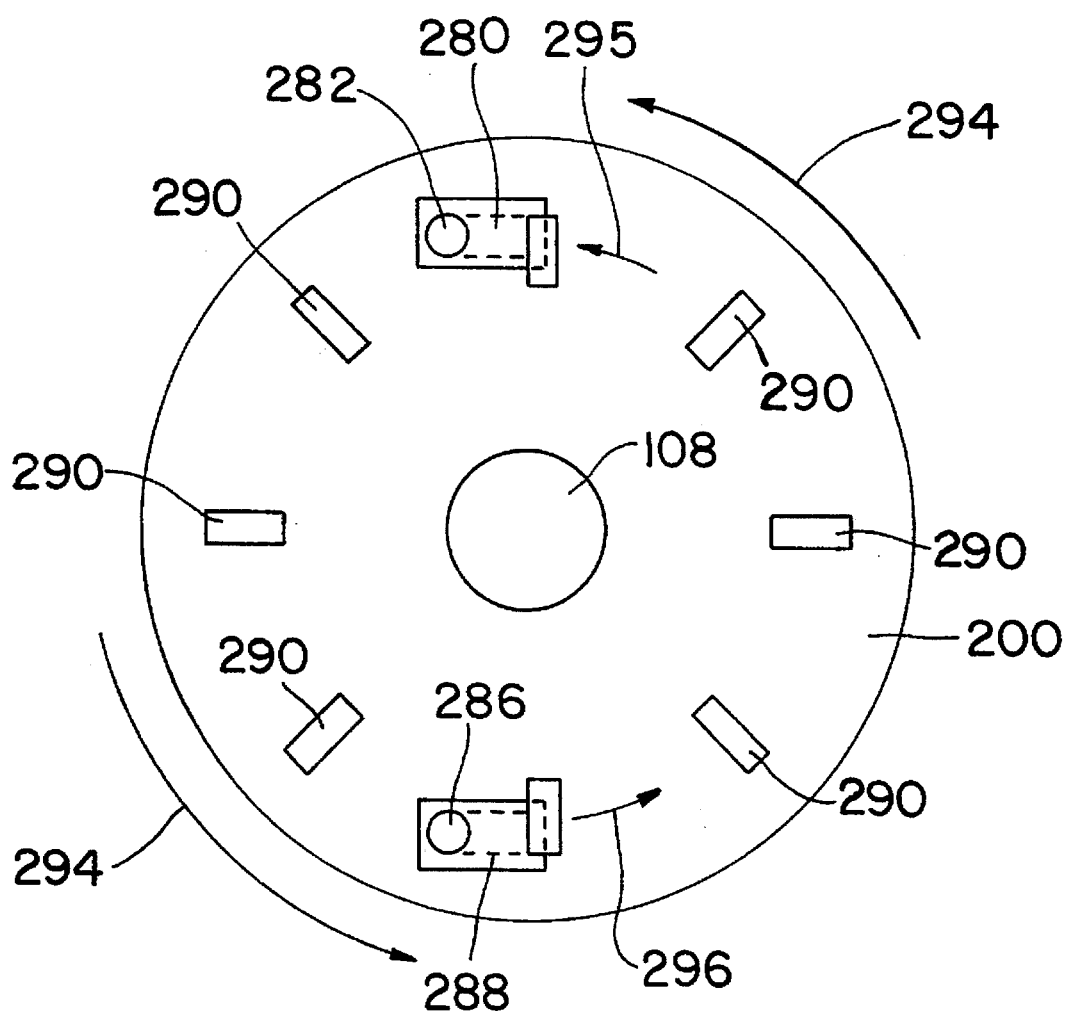
FIG. 4 is a rear elevational view of the forward rotating sealing flange of the aforesaid pump system embodiment of this invention when viewed from the dry or motor end of the pump.

Likewise, because the counterclockwise fluid flow 294 in chamber 234 does not force fluid into orifice 288, this orifice becomes the chamber entry or re-entry orifice, with the fluid in the circulating system including tank 235, conduits 282, 284, and 286 being drawn back into chamber 234 as indicated by reference numeral 296 in FIG. 4 by the vacuum created around orifice 288 by the chamber fluid flow.

The temperature of the barrier fluid within chamber 234 is maintained substantially constant by forcing the fluid therein out of the chamber by way of exit orifice 280 and pitot tube 282. The fluid enters circulating conduit 284 and proceeds to tank 235 where it is preferably cooled by the air blown thereacross by blower 300. The fluid from chamber 234 (and 291) enters tank(s) 235 through entry port(s) 302, flows therethrough where it is cooled, and exits the tank(s) via port(s) 304. After leaving port(s) 304, the fluid continues through conduit(s) 284 until it reaches chamber entry conduit or pitot tube(s) 286 through which the fluid proceeds and reenters chamber 234 by way of entry orifice 288.

In such a manner, the temperature of the rotating seals between flange sealing members 208 and 210 and corresponding stationary engaging members 212 and 214, respectively, is maintained at an acceptable level thereby preserving the flatness associated with the sealing surfaces of these members, preferably to a tolerance of about two helium light bands (0.000023 inches) or less.

In the event that the fluid to be sealed against leaks through the first rotating seal made up of flange sealing member 208 and stationary engaging member 212, thus making its way into barrier fluid chamber 234, the circulating fluid system for maintaining the temperature of the barrier fluid in chamber 234 may be deactivated if desired. Alternatively, the barrier/temperature stabilizing fluid circulation system may continue to operate thus maintaining the temperature of the mixed fluid within chamber 234.

If such a leaking occurs, annular chamber 260 may then be filled (if it was not already) with the barrier/temperature stabilizing fluid maintained at a pressure and temperature to substantially offset the axial and radial pressures directed on stationary engaging member 214 by the fluid to be sealed against present in chamber 234. Chamber 260 may, of course, be filled with such a fluid even if the fluid to be sealed against has not leaked into chamber 234. A plurality of pumping vanes 350 (see FIG. 1) are affixed to shaft 108 within chamber 260 so as to pump the barrier fluid therein to and from the chamber via a tank 235 in order to stabilize its temperature as described above. For purposes of simplicity, the conduits for allowing fluid to enter and leave chamber 260 are not shown, however, these conduits are attached to circulatory conduits 284 at their radially inner longitudinal ends and interface conduits 284 with the central longitudinal portion of elongated chamber/passageway 260. Accordingly, the barrier fluid within chamber 260 has its temperature maintained preferably via a separate tank 235 and the air blown thereacross by blower 300 via cowl 306 due to the pumping action created by vanes 350.

If the fluid to be sealed against happens to leak through both rotating seals shown in FIG. 2, namely the two seals maintained by stationary engaging members 212 and 214, and into elongated chamber 260, the next rotating seal the fluid to be sealed against will encounter includes stationary engaging member 262 and the radially innermost rotating seal 274 affixed to the front surface of sealing flange 202.

Of all of the rotating annular seals formed by stationary engaging members 212, 214, 262, and 274, the annular seal including stationary engaging member 262 is the least sensitive to pump vibration. The reason for this is the disposition of double row bearings 124 closely adjacent flange sealing member 274 and stationary engaging member 262. Stationary engaging member 262 is less sensitive to vibration than its adjacent engaging member 272 because the sealing engagement between flange seal 274 and engaging member 262 is radially closer to pump shaft 108. Therefore, pump shaft vibration affects the radially inner seal to a lesser extent than the outer seal including engaging member 272.

Accordingly, the seal maintained between the rear surface of the nose portion of engaging member 262 and the front surface of flange seal 274 is the most efficient of the four quad-seal rotating seals. The fluid chamber 291 disposed radially between stationary engaging members 262 and 272 is identical in nature to chamber 234, except that it is inverted with respect thereto. The temperature of the preferably clean barrier fluid (e.g. water) within chamber 291 is maintained substantially constant as discussed above with respect to chamber 234. As shown in FIG. 4, if pump shaft 108 is rotating in a counterclockwise direction 294 as viewed from the motor end of the pump, orifice 280 adjacent sealing flange 202 acts as the chamber 291 exit orifice and orifice 288 adjacent flange 202 becomes the chamber 291 entrance orifice. If, however, pump shaft 108 is rotating in a clockwise direction (not shown) as viewed from the motor end of the pump, orifices 288 adjacent flanges 200 and 202 become the chamber exit orifices, orifices 280 becoming the chamber entry orifices due to the fact that orifice 280 and 288 face opposing chamber flow directions.

As is the case with chamber 234, chamber 291, disposed between stationary engaging members 262 and 272, may be filled with barrier fluid to be maintained at a pressure designed to substantially offset the axial and radial pressures directed upon engaging member 262 from the fluid present in chamber 260. The preservation of substantially equivalent pressures in chamber 260 and adjacent engaging member chambers 234 and 291 via port 328 allows the flatness associated with the interface between flange seals 274, 208, 210 and stationary engaging members 212, 214, 262, 272 to be maintained to the aforesaid tolerance.

Turning now to a typical operation of blower 300 and its cooling of motor 102 and the barrier/temperature stabilizing fluid within tank 235, this aspect of the pump system is best shown in FIGS. 5–8. Pump motor 102, constantly being run, must be cooled in order to maintain its operating life. Accordingly, squirrel cage blower 300 is disposed axially rearward of motor 102 and is affixed thereto by cowl 306. Blower 300 produces air flow 330 which is divided into portions 331 and 332 by baffle 308. Portion 332 of the air flow generated by blower 300 flows across the exterior periphery of motor housing 104 through fins 105, preferably at a rate of about 1,500 feet per minute. In such a manner, the operating temperature of motor 102 is maintained at an acceptable level.

Portion 331 of the air flow generated by blower 300 is directed upward and substantially perpendicular relative to portion 332. After being directed by deflector or baffle 308, portion 331 flows upward into outlet port/chimney 314 of cowl 306. The upper end of outlet port 314 surrounds the lower edge of barrier tank 235. Accordingly, while portion 332 of the squirrel cage cooling air flow is directed across the motor, portion 331 is simultaneously directed across the exterior surface of tank 235 so as to stabilize (preferably cool) the barrier/temperature stabilizing fluid therein.

In the alternative, if two such cooling tanks 235 are provided as in FIG. 3(b), one, for example, for chamber 234 and another separate tank 235 for chamber 291, port 314 could be divided into two separate directing portions (not shown) or could simply surround the lower periphery of both tanks. If this were the case, the air blown by blower 300 would simultaneously cool motor 102 and both barrier tanks 235. If port 314 were to be divided into two such separate portions, one for cooling each tank 235, end 310 of baffle 308 could optionally be lowered to a position at or slightly below the horizontal center line of aperture 312 of cowl 306. This would allow a greater amount of air to flow upward via baffle 308 toward both cooling tanks 235. In order to maintain the operating temperature of motor 102 at an acceptable level under such circumstances, a blower 300 of increased power could also be utilized.

It will be understood by those of skill in the art that under certain circumstances, the temperature stabilizing fluid/liquid within tank(s) 235 will need to be heated while disposed therein instead of cooled. In these situations, a conventional air heater should be placed in the flow path of air 331 between blower 300 and tank 235 so as to allow the air reaching tank 235 to heat the tank and temperature stabilizing fluid therein.

The above-described and illustrated elements of the various embodiments of this invention are manufactured and connected to one another by conventional methods commonly used throughout the art.

Once given the above disclosure, therefore, various other modifications, features or improvements will become apparent to the skilled artisan. Such other features, modifications, and improvements are thus considered a part of this invention, the scope of which is to be determined by the following claims:

I claim:

1. A pump system comprising:

a motor for rotating a pump shaft within a pump;

a fluid pumping impeller coupled to said pump shaft, said impeller for pumping a fluid from a fluid inlet to a fluid outlet defined in said pump;

a rotating fluid seal disposed within said pump;

a temperature stabilizing chamber adjacent said rotating seal, said chamber housing a temperature stabilizing fluid for maintaining said seal at a substantially constant and acceptable temperature;

a conduit system for circulating said temperature stabilizing fluid from said chamber to a fluid cooling tank remote from said seal, and thereafter back to said chamber from said tank;

a blower affixed adjacent said pump by way of a cowl, said cowl being disposed between said blower and said motor;

said blower for simultaneously blowing air across both said motor and said tank so as to cool each of said motor and the temperature stabilizing fluid in said tank, the result being that said seal is maintained at a substantially constant and acceptable temperature as said temperature stabilizing fluid is circulated back into said chamber adjacent said seal after being cooled by said blower while in said cooling tank.

2. The pump system of claim 1, wherein said motor is housed within a motor housing and said blower blows air across the exterior periphery or surface of said housing so as to stabilize the temperature of said motor, and said temperature stabilizing fluid is a liquid.

3. The pump system of claim 2, wherein said pump is environmentally safe with said motor housing being sealingly affixed to a pump housing so as to hermetically seal said pump.

4. The pump system of claim 3, wherein said motor housing has a plurality of elongated axially extending guide fins disposed in its radially outer periphery, said fins for guiding said air blown by said blower across said motor housing so as to substantially maintain the temperature of said motor at an acceptable level.

5. The pump system of claim 3, wherein said blower blows said air across both said motor housing and said pump housing.

6. The pump system of claim 1, wherein said cowl includes a baffle for splitting the air blown by said blower into first and second portions, said first portion flowing across said motor and said second portion flowing across said cooling tank.

7. The pump system of claim 6, wherein said first portion of air flows through a portion of said cowl encircling an end of said motor, and said second portion of air blown by said blower flows through a portion of said cowl surrounding a part of said fluid cooling tank.

8. The pump system of claim 1, wherein said tank has a liquid level sensor disposed therein for determining the level of temperature stabilizing fluid in said tank, said system further comprising an alarm coupled to said liquid level sensor for halting operation of said pump if the fluid level in said tank drops below a predetermined point, said temperature stabilizing fluid being a liquid.

9. The pump system of claim 8, further comprising means for introducing an inert gas under pressure into said tank so as to maintain the pressure within said tank and said chamber adjacent said seal at a certain level.

10. The pump system of claim 1, wherein said tank includes an in-flow port and an out-flow port connected to said conduit system, said in-flow port for receiving said temperature stabilizing fluid from said chamber and said out-flow port for delivering cooled temperature stabilizing fluid back into said chamber in order to maintain the temperature of said seal at a substantially constant acceptable temperature, said temperature stabilizing fluid being a liquid;

and wherein said temperature stabilizing fluid is forced from said chamber by a plurality of pumping vanes disposed on a rotating sealing flange.

11. The pump system of claim 10, wherein said temperature stabilizing fluid is one of: (i) water; (ii) mineral oil; (iii) glycol; and (iv) combinations thereof.

12. The pump system of claim 10, wherein said tank is positioned vertically above said blower and said pump.

13. The pump system according to claim 1, further comprising a second temperature stabilizing chamber adjacent a second rotating seal, said second chamber in communication with a second fluid cooling tank, said blower also cooling said fluid in said second tank.

14. A method of stabilizing the temperature of a rotating seal disposed within a centrifugal pump at an acceptable level, said method comprising the steps of:

a) providing in said pump a shaft for rotating a fluid pumping impeller;

b) driving said shaft by way of a motor affixed to said pump;

c) providing a rotating seal within said pump for preventing the fluid being pumped by said impeller from leaking axially along said shaft toward said motor;

d) providing a temperature stabilizing chamber adjacent said rotating seal for maintaining the temperature of said rotating seal at an acceptable level;

e) circulating a temperature stabilizing liquid from said chamber to a barrier tank;

f) heating or cooling said temperature stabilizing liquid while said liquid is in said barrier tank;

g) circulating said stabilized (i.e. heated or cooled) liquid back into said temperature stabilizing chamber adjacent said seal from said barrier tank so as to maintain the temperature of the liquid in said chamber and thus said adjacent seal at a substantially constant and acceptable level; and h) cooling said motor and cooling or heating said temperature stabilizing liquid within said tank by using a blower to simultaneously blow air across both said barrier tank and said motor.

15. The method of claim 14, further comprising the step of:

i) disposing a cowl between said blower and said motor, said cowl dividing the air blown by said blower into two portions, one portion being blown across said motor and the other portion being blown across said tank.

* * * * *